United States Patent [19]

Young

[11] Patent Number: 4,732,348

[45] Date of Patent: Mar. 22, 1988

[54] HANDLE ASSEMBLY WITH ADJUSTABLE DRAG FOR FISHING REEL

[75] Inventor: John N. Young, Fairfax, Calif.

[73] Assignee: Charles C. Worth Corporation, Kentfield, Calif.

[21] Appl. No.: 912,114

[22] Filed: Sep. 29, 1986

[51] Int. Cl.[4] ............................................. A01K 89/02
[52] U.S. Cl. .................................. 242/217; 242/218; 242/219
[58] Field of Search ................... 242/84.5 R, 84.51 R, 242/216, 217, 218, 219, 220

[56] References Cited

U.S. PATENT DOCUMENTS

| | | | |
|---|---|---|---|
| 396,956 | 1/1889 | Prouty | 242/217 |
| 804,047 | 11/1905 | Rockwell | 242/217 |
| 1,467,250 | 9/1923 | Readle | 242/216 |
| 1,730,331 | 10/1929 | Pflueger et al. | 242/217 |
| 3,083,929 | 4/1963 | Sarah | 242/217 |
| 4,572,455 | 2/1986 | Noda | 242/217 |

FOREIGN PATENT DOCUMENTS

| | | | |
|---|---|---|---|
| 328178 | 4/1930 | United Kingdom | 242/219 |
| 389694 | 3/1933 | United Kingdom | 242/219 |

*Primary Examiner*—Donald Watkins
*Attorney, Agent, or Firm*—Melvin R. Stidham

[57] ABSTRACT

In a fishing reel, there is a main drive shaft rotatably on the reel body. A separable input shaft, which may be selectively coupled to either end of the main drive shaft, has a handle free rotatable thereon. A drag disc is slidable on, but splined to the input shaft and a pressure member squeezed a friction member between the drag disc and the handle to adjust the torque that may be transmitted from the handle to the input shaft and, hence, the main drive shaft.

5 Claims, 6 Drawing Figures

HANDLE ASSEMBLY WITH ADJUSTABLE DRAG FOR FISHING REEL

BACKGROUND OF THE INVENTION

Generally, the drag adjustment mechanism for a fishing reel is located inside the housing of the reel, often making it difficult to service it, or to replace its components as required. In addition, the limited space within the reel housing places restrictions on the sizes to which some drag components can be made, thereby limiting the performance characteristics, including smoothness of operation and dissipation of heat of friction, of the mechanism. In addition, with the drag adjustment mechanism located inside the reel housing, conversion of some reels from right-hand to left-hand operation is not feasible. Further, in design and manufacture of the reel, it is often difficult to make connecting linkages from the exterior of the reel as needed to manipulate the drag components located on the interior.

OBJECTS OF THE INVENTION

It is an object of this invention to provide a drag adjustment mechanism that is both situated and operated externally of the body of the reel.

It is a further object of this invention to provide a drag control mechanism that is closely associated with the reel operating handle.

It is a further object of this invention to provide a reel operating mechanism with associated drag control to facilitate conversion of the reel from right-hand to left-hand operation.

It is a further object of this invention to provide a drag mechanism having high capability of dissipating heat of friction.

It is a further object of this invention to provide a drag control mechanism that can be easily serviced without disassembling the fishing reel.

Other objects and advantages of this invention will become apparent from the description to follow, particularly when read in conjunction with the accompanying drawings.

SUMMARY OF THE INVENTION

In carrying out this invention, an input or operating shaft is removably coupled to either end of the main drive shaft of a fishing reel. A drag disc is keyed or splined to the input shaft, while a handle is rotatably mounted thereon. Threaded means are provided to squeeze a friction member between the handle and the drag disc to control the amount of torque that can be transmitted from the handle to the input shaft (and, hence, to the drive shaft) when the handle is rotated.

DESCRIPTION OF PREFERRED EMBODIMENTS

Figure 1:
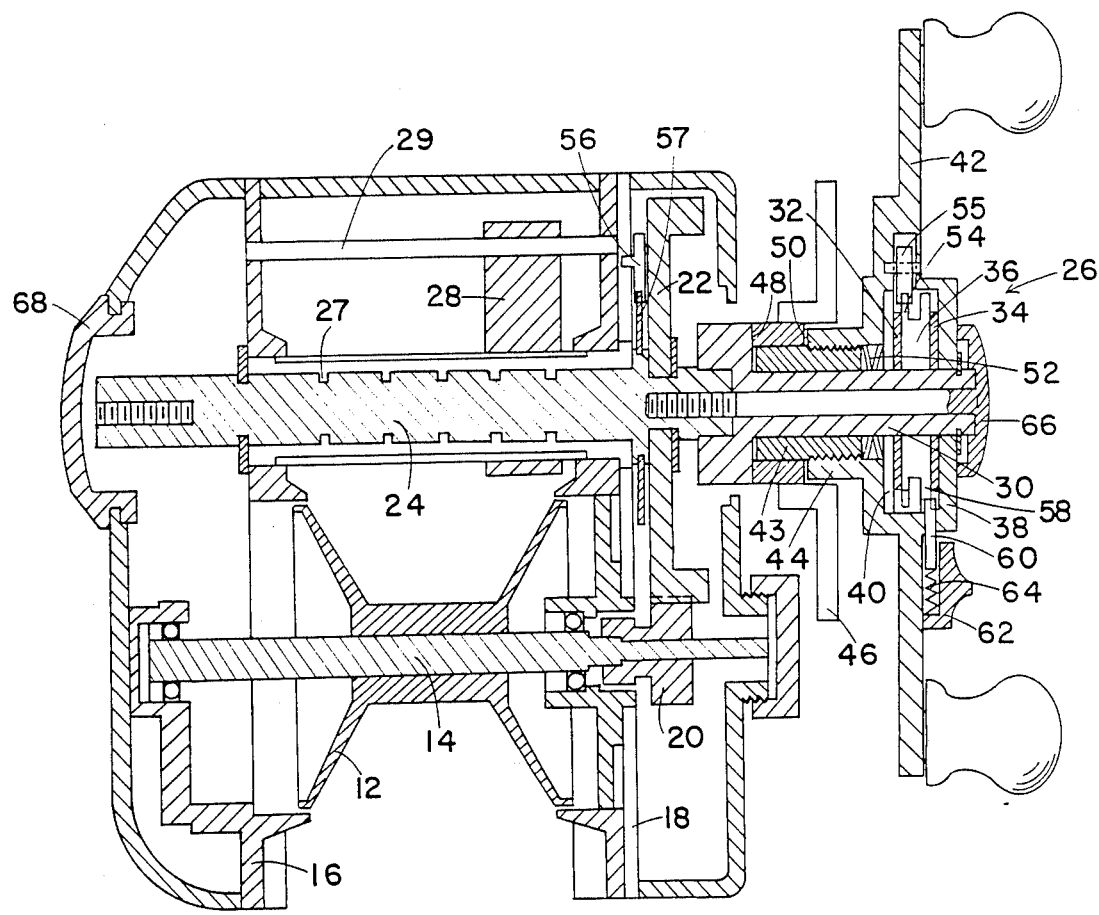
FIG. 1 is a section view of an embodiment of this invention, as it applies to a bait casting reel.
Figure 2:
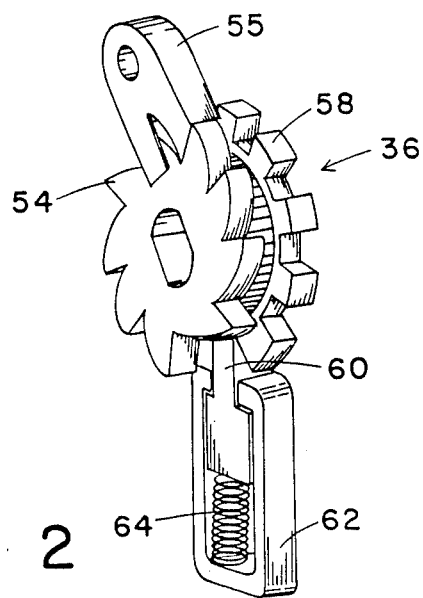
FIG. 2 is an enlarged view in perspective of the torque transmitting mechanism of this embodiment.

The Embodiment of FIGS. 1 and 2

The bait casting reel 10 shown in FIG. 1 includes a spool 12 that is fixed to a spool shaft 14. The spool shaft 14 is rotatably mounted between substantially parallel side support plates 16 and 18 and carries a pinion 20, which, is driven by the main gear 22. The main gear 22 is fixed on a drive shaft 24 to be driven by the drive input assembly 26 to be described. Preferably, a level wind screw 27 is formed on the outer surface of the drive shaft 24 and a level wind slide 28 is threadedly engaged on the lead screw 27 to slide along the rod 29 and distribute fishing line (not shown) evenly over the spool 12 as the line is being retrieved.

Selectively keyed to either end of the drive shaft 24 to drive the main gear is an operating or input shaft 30, forming a part of the handle assembly 26 of this invention. Slidably but non-rotatably carried on the input shaft 30, between a pair of friction discs 32 and 34, is a drag disc 36. Completing the "drag stack" are, on the outside, the cover 38 of the handle 42 and, on the inside, an eared washer 40 that engages positively with the handle crank 42 to rotate therewith. A pressure sleeve 43 is slidable on the input shaft 30 and is threadedly engaged in the hub 44 of the handle 42. The sleeve 43 is rotationally actuated by a drag star 46, which is held against axial movement along the input shaft 30 by engagement between shoulders 48 and 50 on the input shaft 30 and the handle 42, respectively. Hence, as the drag star 46 is turned, the pressure sleeve 44 rotates with it and is threaded moves axially in the hub 44 to compress, through springs 52, the drag stack 32, 34, 36 and 40, thus enabling the handle 42 to rotate the input shaft 30.

One face of the drag disc 36 has standard ratchet teeth 54 (FIG. 2), which are engaged by a pawl 55 carried on the handle 42. This locks the handle 42 to the input shaft 30 in one direction of rotation in what would be the reverse direction of rotation. Anti-reverse pawl and ratchet 56 and 57 fixed respectively to the housing and drive shaft prevent reverse rotation of the drive shaft and, hence, reverse rotation of the handle in that direction. Rotation of the handle in the other, or forward direction, enables drive through the drag stack assembly previously described. The other side of the drag disc 36 has cog teeth 58, which are selectively engaged by a plunger 60 carried on the handle 42. A lock switch 62 is slidably mounted on the handle and, in normal operation, is designed to retract the lock plunger 60 and spring 64. However, when the lock switch 62 is advanced toward the drag disc 36 the plunger spring 64 biases the plunger toward the cogs of the drag disc so that it drops between cogs 58 as the handle is turned. In such condition, all the force applied to turn the handle is directly applied to the input shaft 30, and all the force applied to the line by a hooked fish is transmitted to the handle. That is, a hooked fish is given no play through slippage of the drag stack 32–40.

If it is desired to change from right-hand drive to left-hand drive, the coupling screw 66 is unthreaded from the drive shaft 24 and, with the cover disc 68 removed from the other side of the reel housing 10, the entire assembly 26 with drag mechanism included, is moved over, so that the input shaft 30 is coupled to the left-hand side of the drive shaft 34. Then, the screw 66 is reinserted and tightened.

Should there be any occasion to repair or replace parts of the drag stack, it can be done directly on the separable handle assembly 26, without requiring access to internal parts of the fishing reel 10.

Figures 3, 4:
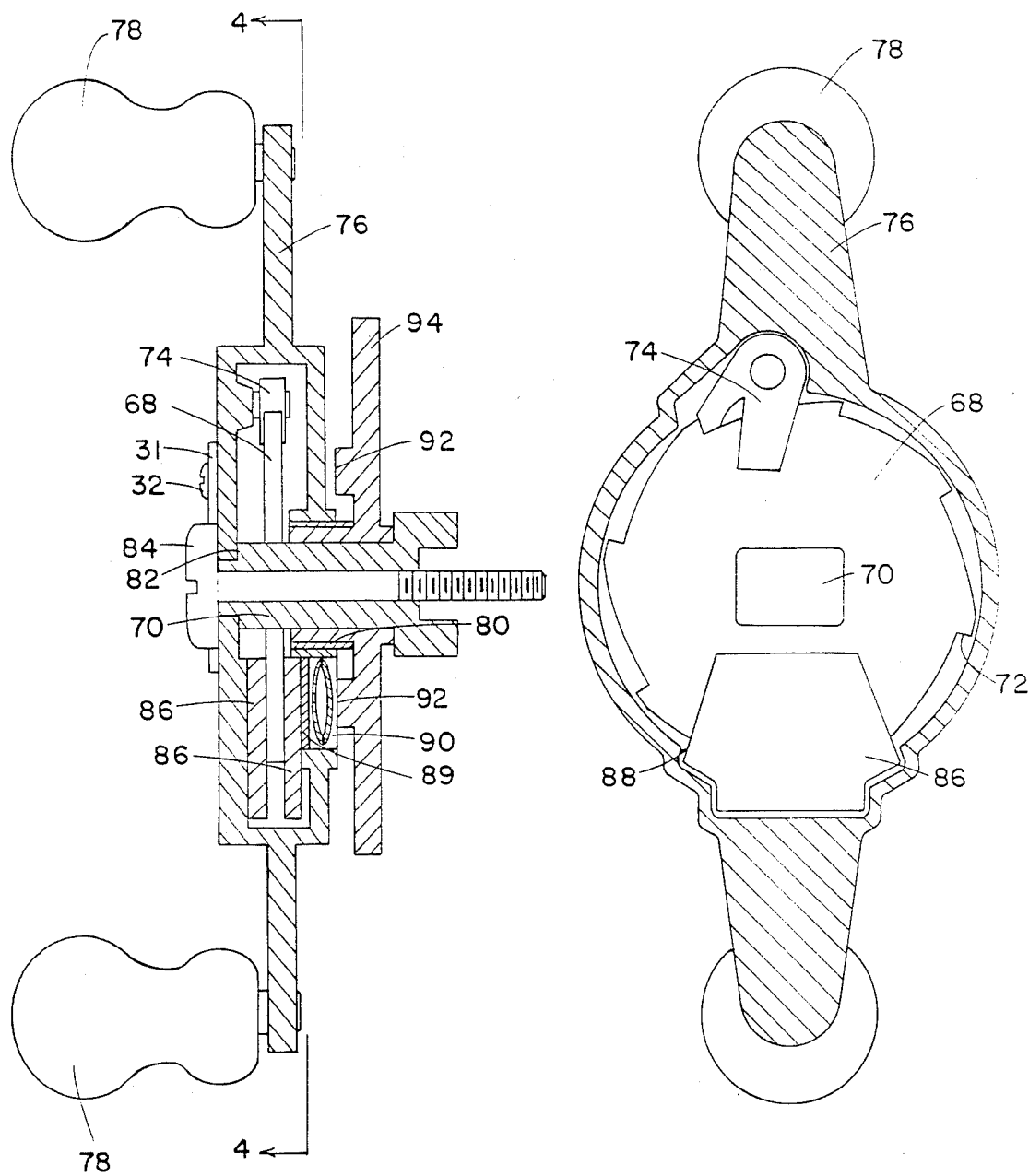
FIG. 3 is a section view of another embodiment of this invention.
FIG. 4 is a section view taken along 4—4 of FIG. 3.

The Embodiment of FIGS. 3 and 4

As in the previous embodiment, the drag disc 68 is slidable on the input shaft 70 but rotates therewith. Anti-reverse ratchet teeth 72, which are formed around the peripheral edge of the drag disc 68, are engaged by a pawl 74 pivotally carried on the handle 76. Knobs 78 facilitate rotation of the handle 76. The handle 76 is free to rotate on the drag star 94, but it is held against slidable movement thereon by means of a shoulder 82 on the drag shaft and the coupling screw 84. Drag pads 86 are held in a handle cavity 88 (FIG. 4) so as to engage a relatively small arcuate portion of the drag disc 68. Hence, any heat of friction that may be generated is quickly dissipated from the exposed face of the drag disc 68. The drag disc pads 86 are squeezed against the drag disc 68 by a pressure plate 89 biased by springs 90. Force is applied to the pressure plate 89 by means of a helical ramp 92 carried on the inner face of a drag star 94. Hence, turning the drag star 94 causes the ramp 92 to engage the pressure plate 89 with increasing or decreasing pressure to increase or decrease the drag pressure applied to the drag disc 68.

Figure 5:
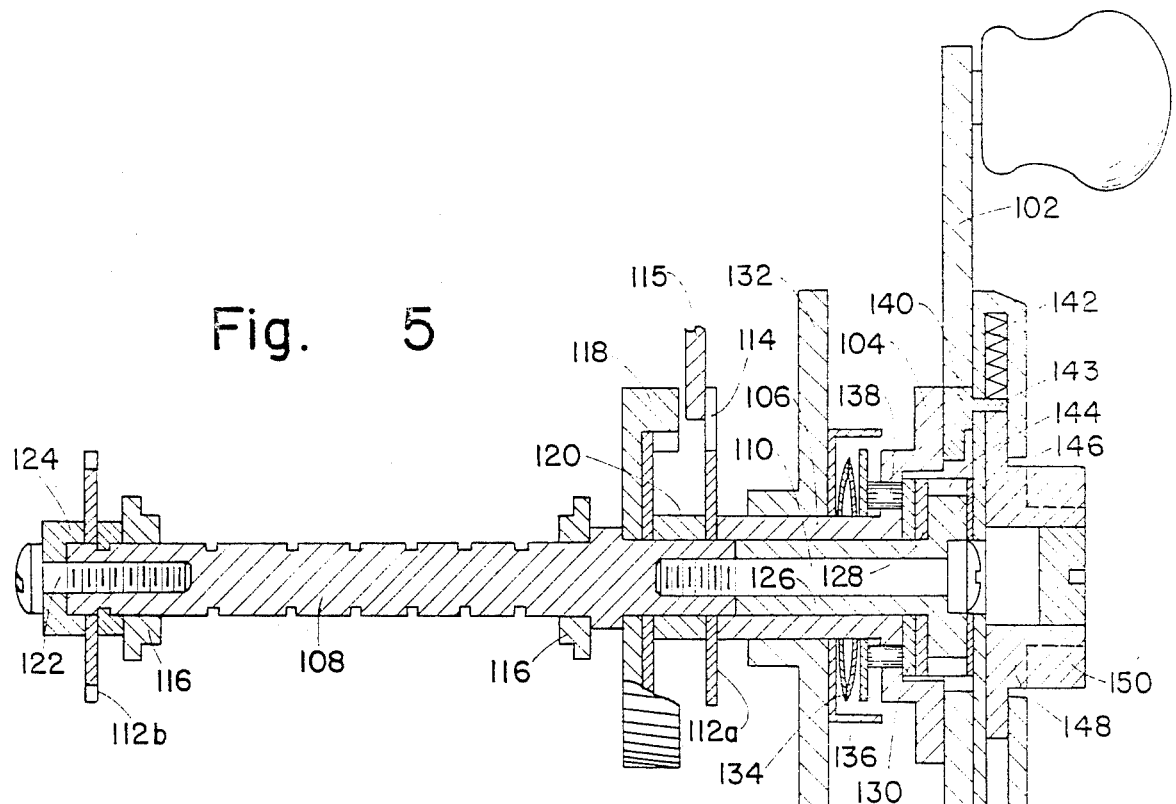
FIG. 5 is a section view of still another embodiment of this invention.
Figure 6:
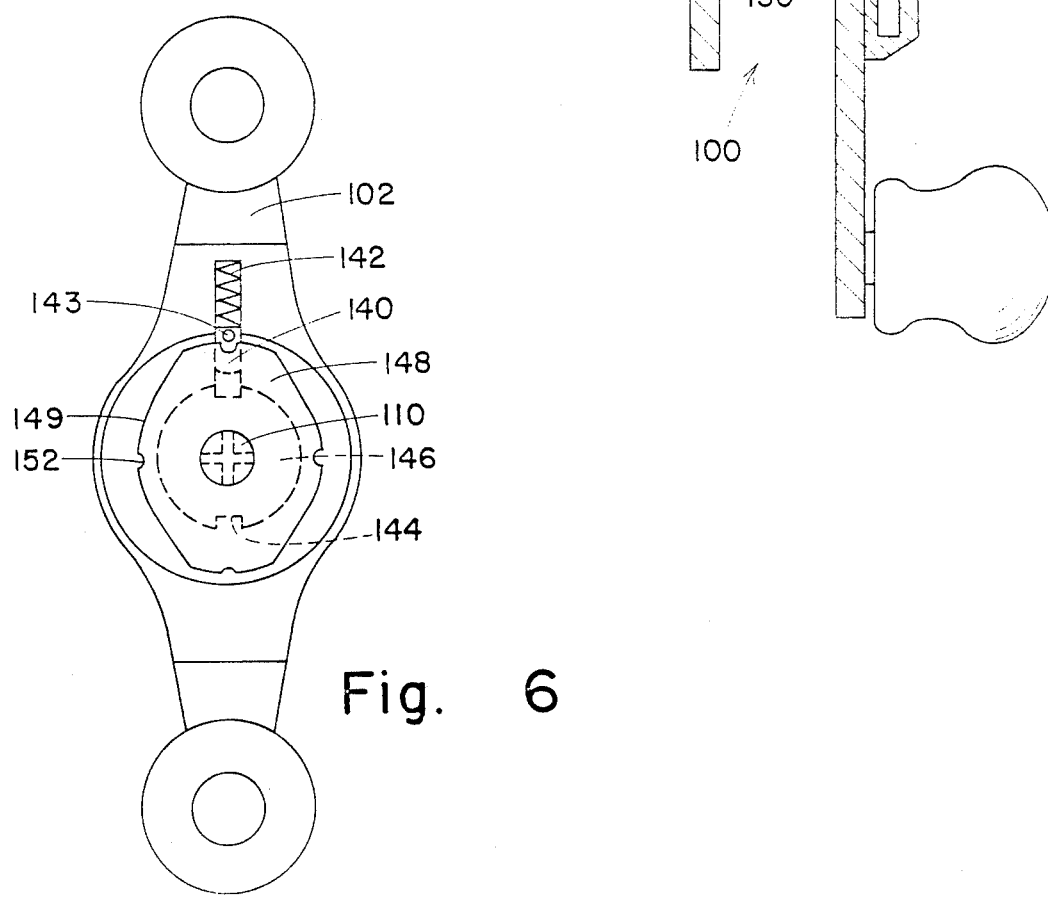
FIG. 6 is an end view of the embodiment of FIG. 5.

The Embodiment of FIGS. 5 and 6

In this embodiment 100, the handle arm 102 has affixed thereto the flange 104 of a handle arm sleeve 106. When the handle assembly 100 is secured to a selected end of the drive shaft 108 by means of a bolt 110, the sleeve 106 interlocks with an anti-reverse ratchet 112a. The ratchet 112a is engaged by a pawl 114, which is carried on the body 115, so that the handle 102 can be turned in one direction only.

The drive shaft 108 is mounted in bearings 116 and carries a main gear 118 to rotate therewith. A collar 120 and the ratchet 112a are rotatably carried on one end of the drive shaft 108. Another ratchet 112b is carried on the other end of the shaft 108 and held in place by a screw 122 and retainer cap 124.

The handle shaft or input shaft 126 is coupled to the selected end of the drive shaft 108 and secured in place by the bolt 110. Rotation of the handle 102 is transmitted to the input shaft 126 through a drag washer 128 squeezed by a drag plate 130. A drag nut 132 may be threaded onto the handle arm sleeve 106 to compress spring washers 134, which force a flat washer 136 against pins 138 protruding axially from the drag plate 130 to effect the compression of the drag stack 128, 130. Since the pins 138 engage through holes in the handle arm sleeve 104, the drag plate 130 rotates with the handle arm and, through the drag washer 128, rotates the input shaft 126 to drive the drive shaft 108.

A locking key 140 carried on the handle arm 102 is biased by a spring 142 toward engagement with a recess 144 (FIG. 6) in a flange 146 integral with the input shaft 126. A drag locking cam 148 turned by a knob 150 normally holds the locking key 140 out of engagement with the recess 144 so that the drag stack 128, 130 is free to operate.

However, when the cam 148 is turned to a low profile 149 and the cam follower 143 on the locking key drops into a notch 152, the spring 142 is free to bias the locking key 140 into a recess 144 and lock the handle 102 to the handle shaft 106 for positive drive, without drag.

While this invention has been described in conjunction with preferred embodiments thereof, it is obvious that modifications and changes therein may be made by those skilled in the art to which it pertains without departing from the spirit and scope of this invention, as defined by the claims appended hereto.

For example, the embodiments previously described in conjunction with bait casting reels can easily be applied to other types of fishing reels. In all cases, the drive input shaft with drag mechanism associated therewith is simply coupled to a conventional driving shaft for the reel, whether it be a bait casting reel, a spin casting reel or any other type of reel.

What is claimed as invention is:

1. A fishing reel comprising:
    a reel body;
    a drive shaft rotatable on said reel body;
    an input shaft;
    a handle freely rotatable on one end of said input shaft;
    a drag disc slidable but not rotatable on said input shaft;
    ratchet teeth around said drag disc;
    a first anti-reverse pawl on said handle and engageable with said drag disc ratchet teeth, normally to cause said drag disc and said handle to rotate together in a reverse, unwinding direction and to enable free forward rotation of said handle;
    a second anti-reverse ratchet fixed on said drive shaft;
    a second anti-reverse pawl on said body engaging said second anti-reverse ratchet to prevent reverse rotation of said drive shaft;
    a drag mechanism interposed between said handle and said drag disc operative to impart forward rotation of said handle to said drag disc; and
    complementary releasable coupling means on each end of said drive shaft and on the other end of said input shaft to enable rotation of said shafts together, with said input shaft and handle on either end of said drive shaft.

2. The fishing reel defined by claim 1 wherein said drag mechanism comprises:
    stop means on said one end of said input shaft to prevent outward axial movement of said handle;
    a thrust member carried on said handle to rotate therewith;
    a friction member interposed between said thrust member and said drag disc; and
    thrust applying means on said input shaft and movable axially in one direction to increase pressure of said thrust member against said friction member and in the other direction to relieve such pressure.

3. The fishing reel defined by claim 2 wherein:
    said handle is hollow with an inboard wall and an outboard wall adjacent said one end of the input shaft forming a chamber between them; and
    said drag disc is within said chamber;
    and including:
    a second friction member interposed between said drag disc and said outboard wall;
    whereby said thrust applying means is operative when moved in said one direction to squeeze said friction members and said drag disc between said thrust member and said outboard wall.

4. The fishing reel defined by claim 1 including:

mutually engageable means on said handle and said drag disc selectively operable to prevent relative rotation thereof in either direction.

5. A fishing reel comprising:

a reel body;

a drive shaft rotatable on said reel body;

an input shaft;

a handle freely rotatable on one end of said input shaft;

complementary releasable coupling means on each end of said drive shaft and on the other end of said input shaft to enable rotation of said shafts together with said input shaft and handle on either end of said drive shaft;

a drag disc slidable but not rotatable on said input shaft;

an anti-reverse ratchet fixed on said drive shaft;

a second anti-reverse pawl on said body engaging said second anti-reverse ratchet to prevent reverse rotation of said drive shaft;

a drag mechanism interposed between said handle and said drag disc operative to impart forward rotation of said handle to said drag disc; and mutually engageable means on said handle and said drag disc selectively operable to prevent relative rotation thereof in either direction.

* * * * *